N. W. WARMAN.
AUTOMATIC ADJUSTABLE SPOTLIGHT.
APPLICATION FILED FEB. 10, 1920.
1,433,317. Patented Oct. 24, 1922.
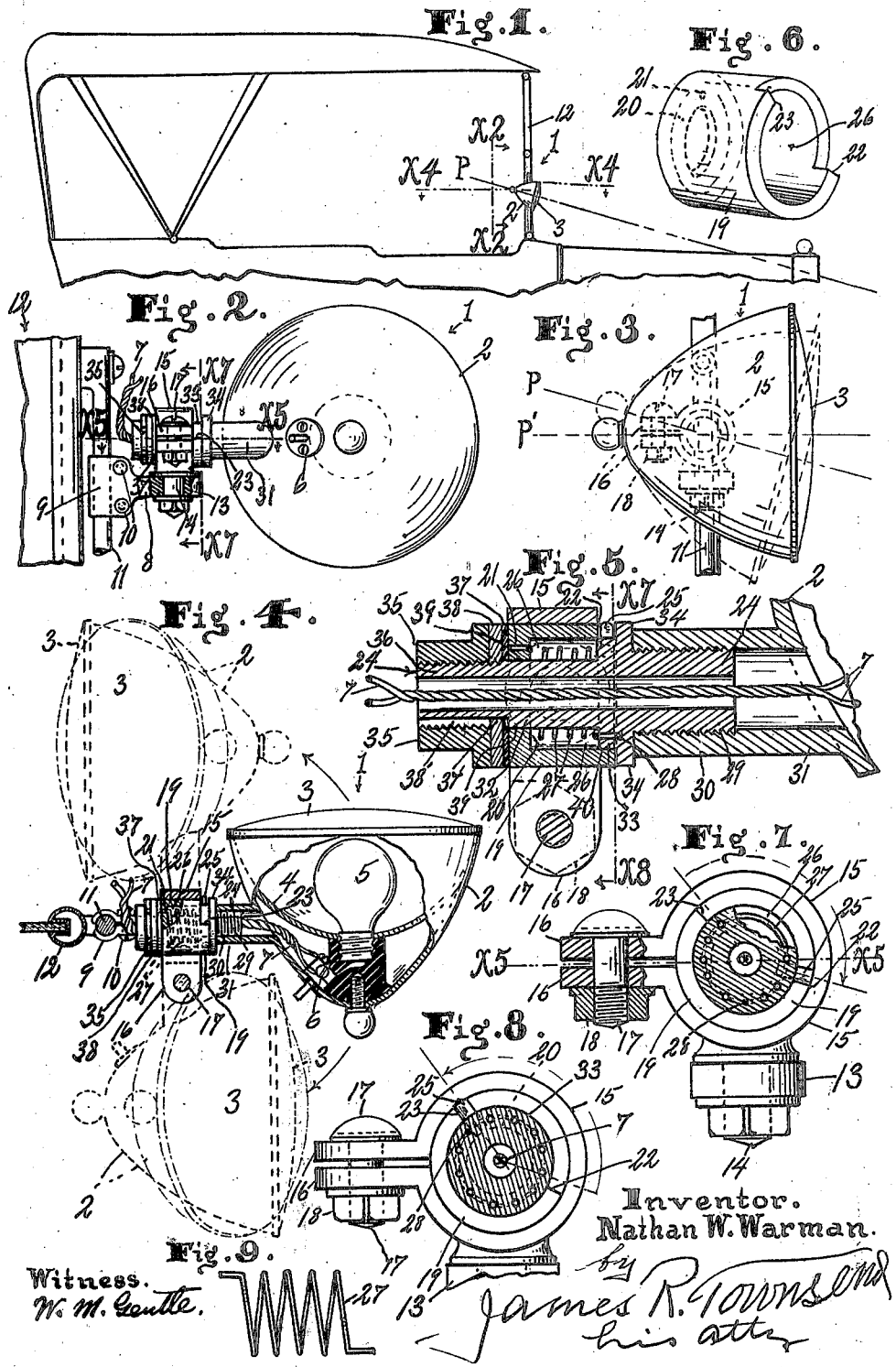
Witness.
W. M. Gentle.
Inventor.
Nathan W. Warman.
by James R. Townsend
his atty Patented Oct. 24, 1922.

1,433,317

UNITED STATES PATENT OFFICE.

NATHAN W. WARMAN, OF LOS ANGELES, CALIFORNIA, ASSIGNOR TO JAMES A. DARSIE AND GEORGE DARSIE, BOTH OF LOS ANGELES, CALIFORNIA.

AUTOMATIC ADJUSTABLE SPOTLIGHT.

Application filed February 10, 1920. Serial No. 357,677.

*To all whom it may concern:*

Be it known that I, NATHAN W. WARMAN, a citizen of the United States, residing at Los Angeles, in the county of Los Angeles and State of California, have invented a new and useful Automatic Adjustable Spotlight, of which the following is a specification.

This invention relates to adjustable devices on vehicles adapted to illuminate roadways and objects such as signs, gutters, obstructions and the like, along the roadways.

Spot lights on vehicles are carried for the purpose of lighting the roadway and sides of the roadway and also for illuminating guide boards and other objects at the sides of the roadway and are preferably undimmed. The road laws of different States contain various requirements and regulations fixing the position to which spot lights carried on cars must be normally set so as to avoid blinding approaching travelers.

That is to say the lights must be so applied to the car that the central rays thereof will meet the ground at a certain distance in front of the car on level road so that the direct rays will not reach the eyes of the drivers or passengers of approaching vehicles.

It is necessary that when the light is in normal position it shall not be displaced therefrom by the jolting and jarring of the travelling car, otherwise the driver may find himself penalized for driving his car with the light out of legal adjustment. It is necessary therefore, that the adjustable spot light be set to a predetermined position during the normal travel of the car, and in the practice heretofore, much inconvenience and delay is involved in returning the spot light to its normal position after it has been turned to illuminate an object outside of its normal range.

This invention consists in means connected and combined with a spot light and the vehicle whereby the spot light is normally held in the legally required position to illuminate the road and can be easily turned to illuminate any other part of the road or any surrounding objects, and which when released by the driver and left free will automatically return to the legally required position.

A feature of the invention is a double swivel appliance by means of which the spot light is adapted to be turned to send its rays in various directions relative to the vehicle and which allows the spot light to be turned in any direction.

Other objects and advantages and features of invention may appear from the accompanying drawing, the subjoined detailed description and the appended claims.

The accompanying drawing illustrates the invention.

Figure 1 is a side elevation of the spot light attached to the wind shield of an automobile, the lower part of which is broken away. A broken line practically indicates the angle to which the light is normally adjusted.

Fig. 2 is an enlarged rear elevation of the spot light viewed from line $x^2$, Fig. 1, with the light raised about fifteen degrees or to a position where its center rays are level and straight ahead of the vehicle.

Fig. 3 is a side elevation of the spot light on the same scale and in the same position as Fig. 2. Dotted lines indicate the position of the spot light in Fig. 1, and broken lines indicate the direction of the axis of the projected light in the respective positions.

Fig. 4 is a fragmental plan of the spot light. Dash lines indicate deflected positions of the lamp.

Fig. 5 is a section on line $x^5$, Figs. 2 and 7 showing the automatic return appliance in enlarged scale.

Fig. 6 is a perspective view of the spring barrel of the automatic return appliance.

Fig. 7 is a sectional elevation on line $x^7$, Figs. 2 and 5 showing in detail the means for clamping the spring barrel in position; also the stop pin of the spot light arm engaging the lower stop of the barrel casing.

Fig. 8 is a section similar to Fig. 7 showing an altered position of the spot light arm and contact pin.

Fig. 9 is a side elevation of the spring for actuating the spot light arm.

1 indicates in a general way the spot light lamp and the line $p$ indicates a predetermined normal direction of light projection. Line $p'$ indicates a direction of light projection at a temporary shifting of the lamp for throwing the spot light to a higher level.

The spot light lamp 1 is of usual construction being provided with a housing 2 in which are secured the lens 3, reflector 4 and bulb 5 the filament of which bulb is connected through switch 6 and wiring 7 to an electrical source, not shown.

It is customary to support automobile spot lights on the wind shield or on a rod connected to the wind shield of the automobile, and in the present case the means for such connection comprises a bracket 8, which has a bifurcated end 9 that is clamped by bolts or screws 10 to an upright rod 11 on the wind shield 12. The bracket 8 is provided with a bearing 13 in which is journaled the pin 14 of a swivel clamp 15 adapted by means of the lugs 16, bolt 17 and nut 18 to clamp the spring barrel 19, the axis of which is at right angles to the axis of the pin 14. The pin is held in the bracket by suitable means as the nut 18.

The spring barrel is a hollow cylinder provided at one end with an inwardly projecting annular shoulder 20 which is provided with a spring-seat 21. The end of the barrel opposite the shoulder is offset to form diametrical stops 22, 23. The lamp is held by an arm comprising a hollow oscillating member 24, which is shown as a shaft journaled in the barrel provided with a stop in the form of a pin or lug 25 to cooperate with the stops on the sleeve to allow only a limited oscillation of the lamp upon an axis at an angle to the direction of light projection. The barrel 19 is provided with a chamber 26 surrounding the oscillating member and a spring 27 which spring has one end seated in the spring-seat 21 of the barrel, and the other end seated in a seat 28 in the oscillating member. The spring is arranged to return the oscillating member to normal position with the stop lug 25 in engagement with that one of said stops which is adapted to that position.

The oscillating member shown consists of a hollow shaft 24 provided with a threaded end portion 29 to engage a threaded portion 30 of the lamp shank or stem 31, and is also provided with intermediate journals 32 and 33 and with a lateral projection 34 which is shown as a collar against which a portion of the barrel is held by a nut 35 screwed onto the opposite end 36 of said shaft. A fiber washer 37 and a metallic washer 38 are interposed between the barrel 24 and the nut 33 and the metallic washer has a tooth 37' inserted in a groove 38' to prevent loosening of the nut through frictional contact with the barrel when the shaft is turned.

The shaft 24 is provided with cylindrical bearing surfaces at 39, 40, of different diameters to fit the shoulder 20 and the inside of the chamber 26 of the barrel 19; and the collar 34 is provided with the seat 28 for attachment of the second end of the spring 27. The electric conductor 7 extends through the hollow oscillating member 24 and through the hollow lamp stem so that the lamp is free to be oscillated from and to the normal position of the lamp which is shown in solid lines in Fig. 1 and in broken lines in Fig. 3.

In practical use the lamp may be set to throw its rays in any desired direction by adjusting the clamps 9 and 15. The spring 27 is arranged to normally hold the lamp in lowered position to throw the light downward and forward; and oscillation in opposition to the spring will raise the light to any desired position, determined by the position of the upper limit stop.

When the driver of the car desires to inspect any roadside object, as a sign, he may turn the lamp on the swivel stem 14 to the required position as indicated by broken lines in Fig. 4, and will tilt the lamp against the pressure of the spring 27 until the inspection is completed. Then he may return the lamp to such straight forward adjustment as is desired, and upon release, the spring will return the lamp to project the light in the predetermined direction.

I claim.

1. A light for vehicles comprising a lamp; a bearing; a stem extending from said lamp and revolvably mounted in the bearing; said stem being provided with a lug; shoulders on said bearing adapted to cooperate with said lug to limit the angular movement of said stem; a spring within said bearing, one end of said spring being secured to said stem and the opposite end to said bearing whereby the lug is normally held positioned against one of said shoulders; and a support for said bearing, said support comprising a swiveled pin having a clamp secured thereto in which the bearing is adustably mounted.

2. A light for vehicles comprising a lamp; a stem extending from said lamp and having a plurality of journals intermediate its ends; a barrel having an offset end to form stops, and a shoulder opposite said end, said journals adapted to fit said shoulder and the inside of the barrel; a support for said barrel comprising a clamp encircling said barrel for securing the barrel in adjusted positions; and means on said stem adapted to operate in the offset portion of said barrel to cooperate with the stops to limit the movement of said stem.

3. A light for vehicles comprising a lamp; a stem extending from said lamp and having a plurality of journals intermediate its ends; a barrel having an offset end forming stops, and a shoulder opposite said end, said journals adapted to fit said shoulder and the inside of the barrel; a support for said barrel comprising a clamp encircling said barrel for securing the barrel in adjusted positions; a lug on said stem adapted to operate in the offset portion of said barrel to limit the movement of said stem; and means in said barrel adapted to normally hold said lug against one of said stops.

4. A light for vehicles comprising a lamp; a stem extending from said lamp and having a plurality of journals intermediate its ends; a barrel having an offset end, and a shoulder opposite said end, said journals adapted to fit said shoulder and the inside of the barrel; a support for said barrel comprising a clamp encircling said barrel for securing the barrel in adjusted positions, a bracket adapted to be fastened to a vehicle, and a pin extending at right angles to the axis of the barrel and journaled in said bracket; and means on said stem adapted to operate in the offset portion of said barrel to limit the movement of said stem.

In testimony whereof, I have hereunto set my hand at Los Angeles, California, this 3rd day of February, 1920.

NATHAN W. WARMAN.

Witness:
　　JAMES R. TOWNSEND.